(12) United States Patent
Cao et al.

(10) Patent No.: US 9,582,333 B2
(45) Date of Patent: Feb. 28, 2017

(54) MANAGING A SET OF ASSETS OF A SHARED POOL OF CONFIGURABLE COMPUTING RESOURCES

(71) Applicant: International Business Machines Corporation, Armonk, NY (US)

(72) Inventors: Bin Cao, Rochester, MN (US); James E. Carey, Rochester, MN (US); Bradley L. Manning, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/745,654

(22) Filed: Jun. 22, 2015

(65) Prior Publication Data
US 2016/0371125 A1    Dec. 22, 2016

(51) Int. Cl.
G06F 9/46    (2006.01)
G06F 9/50    (2006.01)
G06F 9/455    (2006.01)

(52) U.S. Cl.
CPC ........ G06F 9/5061 (2013.01); G06F 9/45533 (2013.01); G06F 9/5077 (2013.01)

(58) Field of Classification Search
CPC ...... G06F 9/48; G06F 9/5061; G06F 9/45533; G06F 9/5077
See application file for complete search history.

(56) References Cited

U.S. PATENT DOCUMENTS

| | | | |
|---|---|---|---|
| 6,370,646 B1 | 4/2002 | Goodman et al. | |
| 7,203,944 B1 * | 4/2007 | van Rietschote | ... G06F 9/45533 718/1 |
| 8,108,456 B2 | 1/2012 | Chen et al. | |
| 8,615,579 B1 | 12/2013 | Vincent et al. | |
| 8,893,118 B2 | 11/2014 | Guminy et al. | |
| 2012/0096460 A1 * | 4/2012 | Sekiguchi | ........... G06F 9/45558 718/1 |
| 2014/0165063 A1 * | 6/2014 | Shiva | ...................... G06F 21/57 718/1 |

OTHER PUBLICATIONS

Al-Kiswany, Samer, et al., "VMFlock: Virtual Machine Co-Migration for the Cloud," Proceedings of the 20th International Symposium on High Performance Distributed Computing, pp. 159-170, ACM, 2011.

(Continued)

*Primary Examiner* — Camquy Truong
(74) *Attorney, Agent, or Firm* — Kevin Kehe (57) ABSTRACT

Disclosed aspects manage a set of assets of a shared pool of configurable computing resources. A set of usage data is established by the shared pool of configurable computing resources. The set of usage data corresponds to usage of the set of assets by a set of users. The shared pool of configurable computing resources determines an asset load-order based on the set of usage data. An operation associated with the set of assets is performed by the shared pool of configurable computing resources. In response to performing the operation associated with the set of assets, the set of assets is loaded based on the asset load-order by the shared pool of configurable computing resources.

18 Claims, 5 Drawing Sheets

(56) References Cited

OTHER PUBLICATIONS

Adaptive Computing, Node Allocation Policies, <http://docs.adaptivecomputing.com/mwm/Content/topics/prio_res/nodeallocation.html>.
Woolf, Bobby, Managing application runtime environments in IBM PureApplication System, Oct. 10, 2012.
Mell, Peter, et al., The NIST Definition of Cloud Computing, National Institute of Standards and Technology, Oct. 7, 2009, Version 15, NIST, Gaithersburg, MD, US.
Cao, Bin, et al., "Managing a Set of Assets of a Shared Pool of Configurable Computing Resources", U.S. Appl. No. 14/752,916, filed Jun. 27, 2015.
List of IBM Patents or Patent Applications Treated as Related.

\* cited by examiner

MANAGING A SET OF ASSETS OF A SHARED POOL OF CONFIGURABLE COMPUTING RESOURCES

BACKGROUND

This disclosure relates generally to computer systems and, more particularly, relates to managing a set of assets of a shared pool of configurable computing resources. The amount of data that needs to be managed by enterprises is increasing. Management of a set of assets may be desired to be performed as efficiently as possible. As data needing to be managed increases, the need for management efficiency may increase.

SUMMARY

Disclosed aspects manage a set of assets of a shared pool of configurable computing resources. A set of usage data is established by the shared pool of configurable computing resources. The set of usage data corresponds to usage of the set of assets by a set of users. The shared pool of configurable computing resources determines an asset load-order based on the set of usage data. An operation associated with the set of assets is performed by the shared pool of configurable computing resources. In response to performing the operation associated with the set of assets, the set of assets is loaded based on the asset load-order by the shared pool of configurable computing resources.

In embodiments, a set of profile information is collected. The set of usage data may have the set of profile information. The set of profile information can include an application log, a user history, usage of a virtual machine, an application dependency relationship, or a system dependency relationship. To determine the asset load-order, the set of profile information can be analyzed. The asset load-order can have a dependency relationship factor, a temporal period factor, or a user-indicated factor.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure utilize information (e.g., usage data, profile information, user-patterns) to determine a priority of a virtual machine for obtaining resources as the virtual machine comes into a use-state after an operation (e.g., deploy, migration). Accordingly, virtual machines of higher precedence/importance/status are able to do more valuable tasks sooner/earlier. Similarly, less valuable tasks may be postponed. In embodiments, historical usage data may be utilized. For example, prior behavior/activity may be utilized to compute/determine a load-order.

Aspects of the disclosure include a method, system, and computer program product for managing a set of assets of a shared pool of configurable computing resources. A set of usage data is established by the shared pool of configurable computing resources. The set of usage data corresponds to usage of the set of assets by a set of users. The shared pool of configurable computing resources determines an asset load-order based on the set of usage data. An operation associated with the set of assets is performed by the shared pool of configurable computing resources. In response to performing the operation associated with the set of assets, the set of assets is loaded based on the asset load-order by the shared pool of configurable computing resources.

In embodiments, a set of profile information is collected. The set of usage data may have the set of profile information. The set of profile information can include an application log, a user history, usage of a virtual machine, an application dependency relationship, or a system dependency relationship. To determine the asset load-order, the set of profile information can be analyzed. The asset load-order can have a dependency relationship factor, a temporal period factor, or a user-indicated factor.

In embodiments, the set of assets includes a virtual machine (to provide a computing capability) or a plurality of virtual machines (which cooperate to provide a computing capability). The operation may include a capture operation, a deploy operation, a migration operation, a resize operation, or a recovery operation. Altogether, performance or efficiency benefits when managing a set of assets may occur (e.g., speed, flexibility, responsiveness, resource usage). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
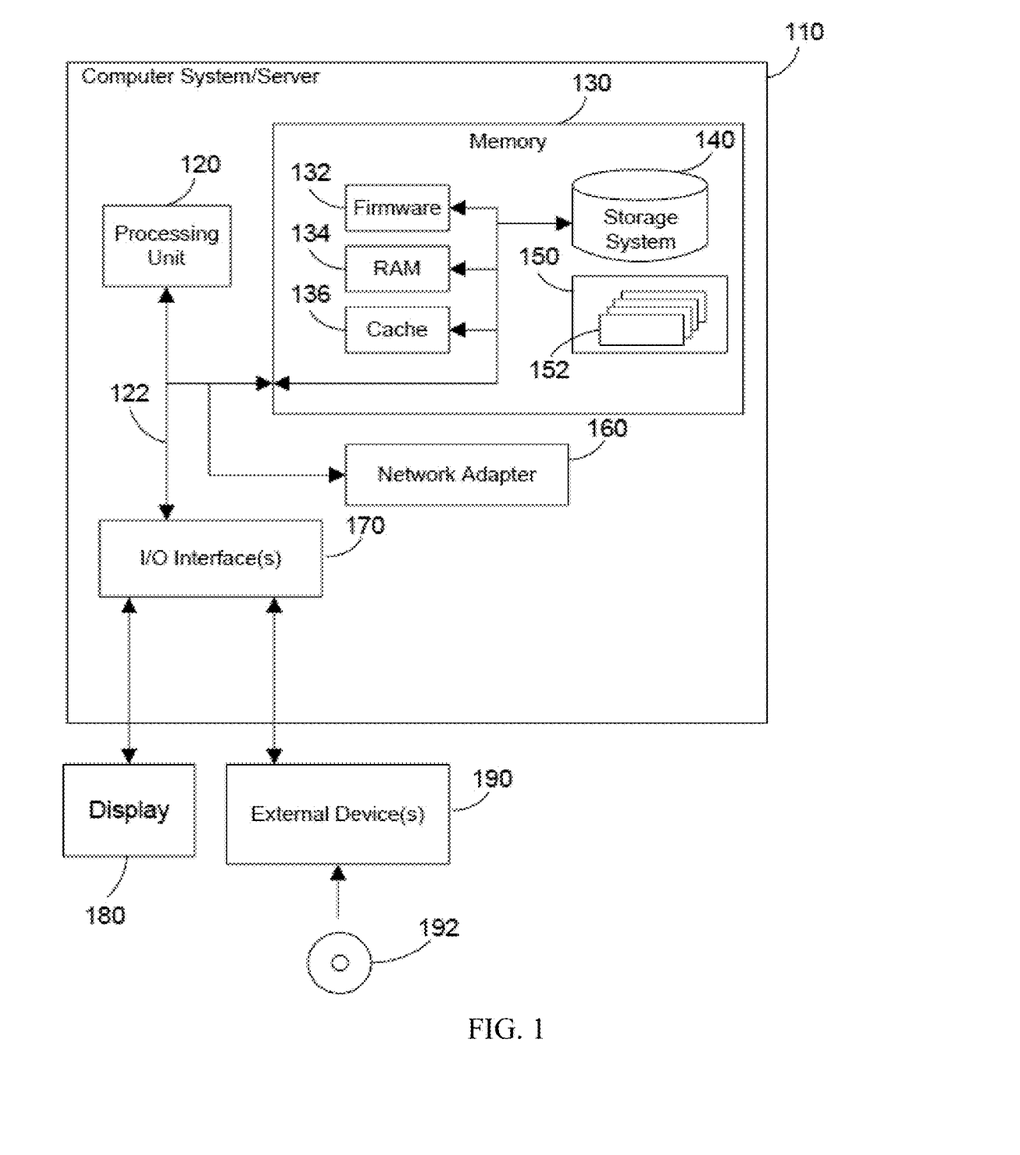
FIG. 1 depicts a cloud computing node according to embodiments.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
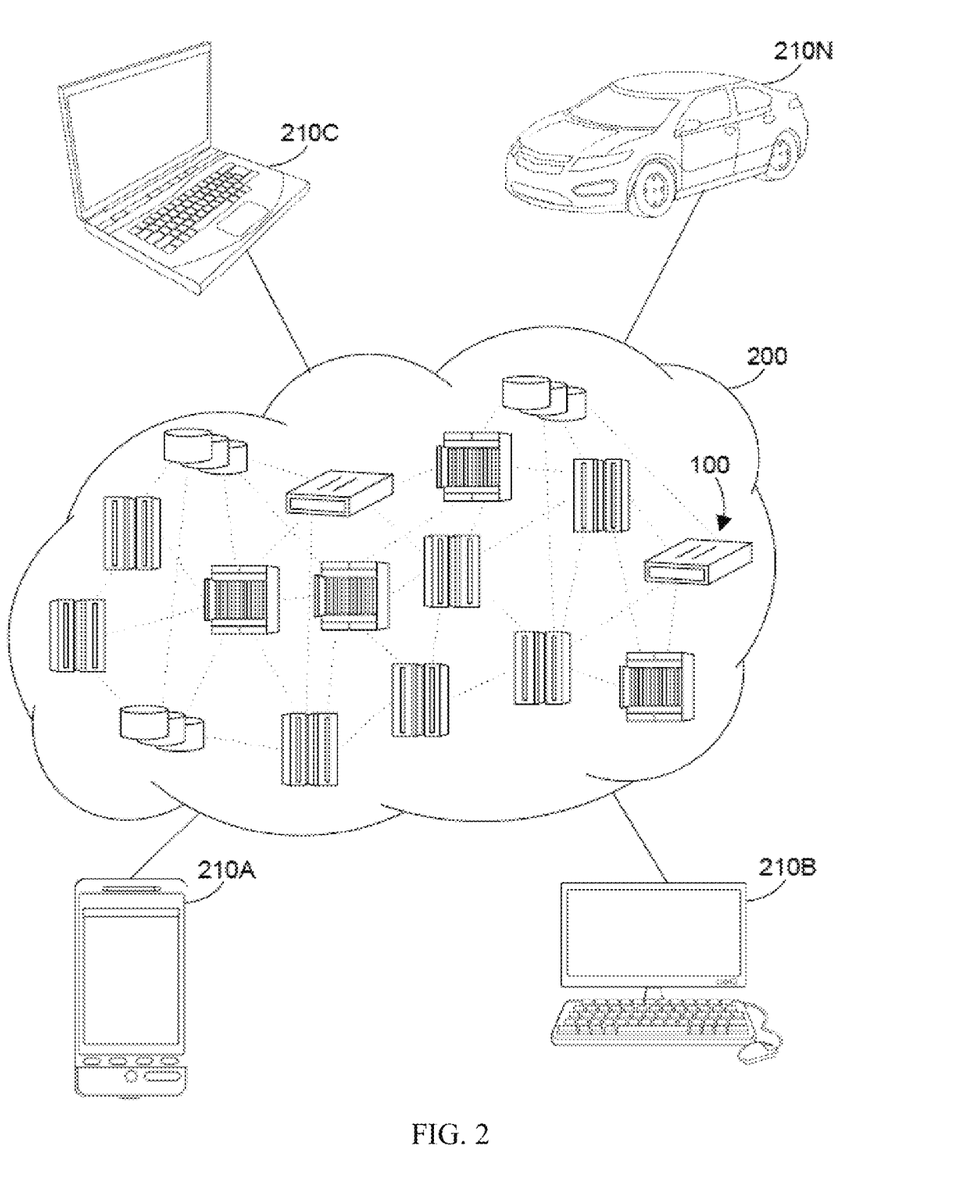
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
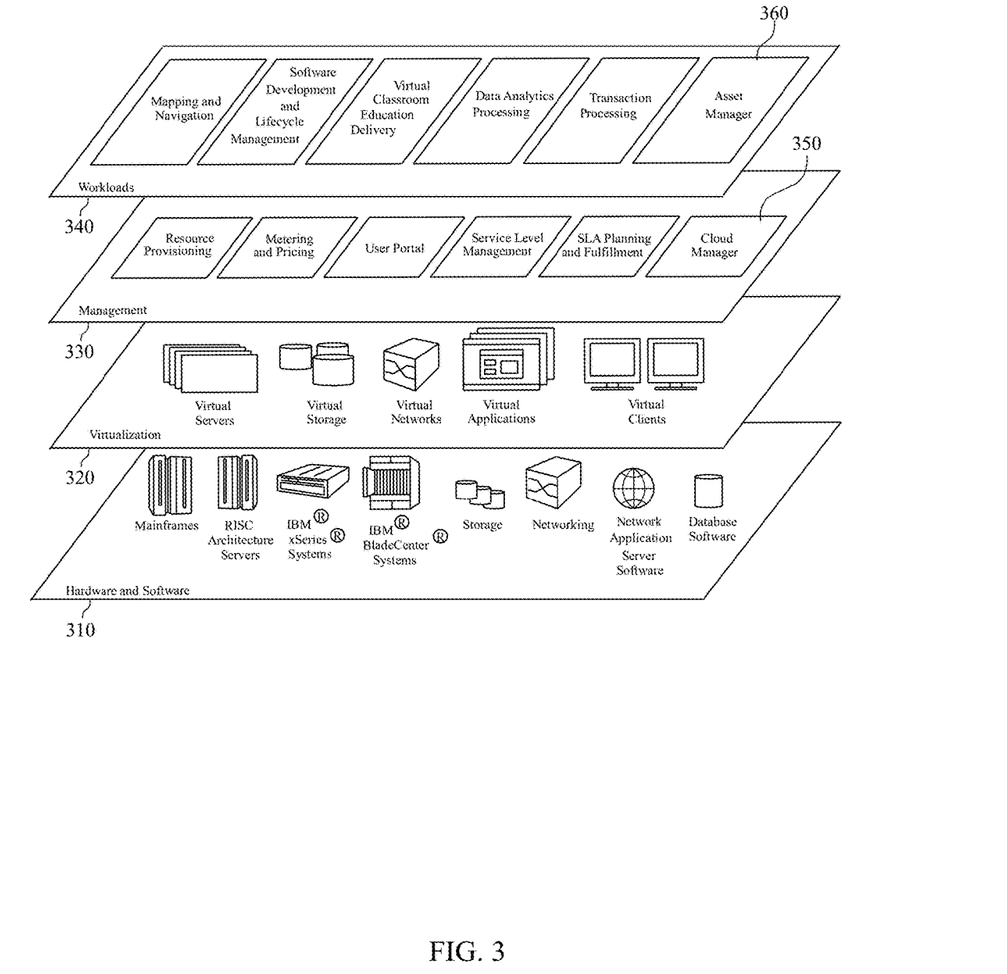
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an asset manager 360, which may manage a set of assets as discussed in more detail below.

Figure 4:
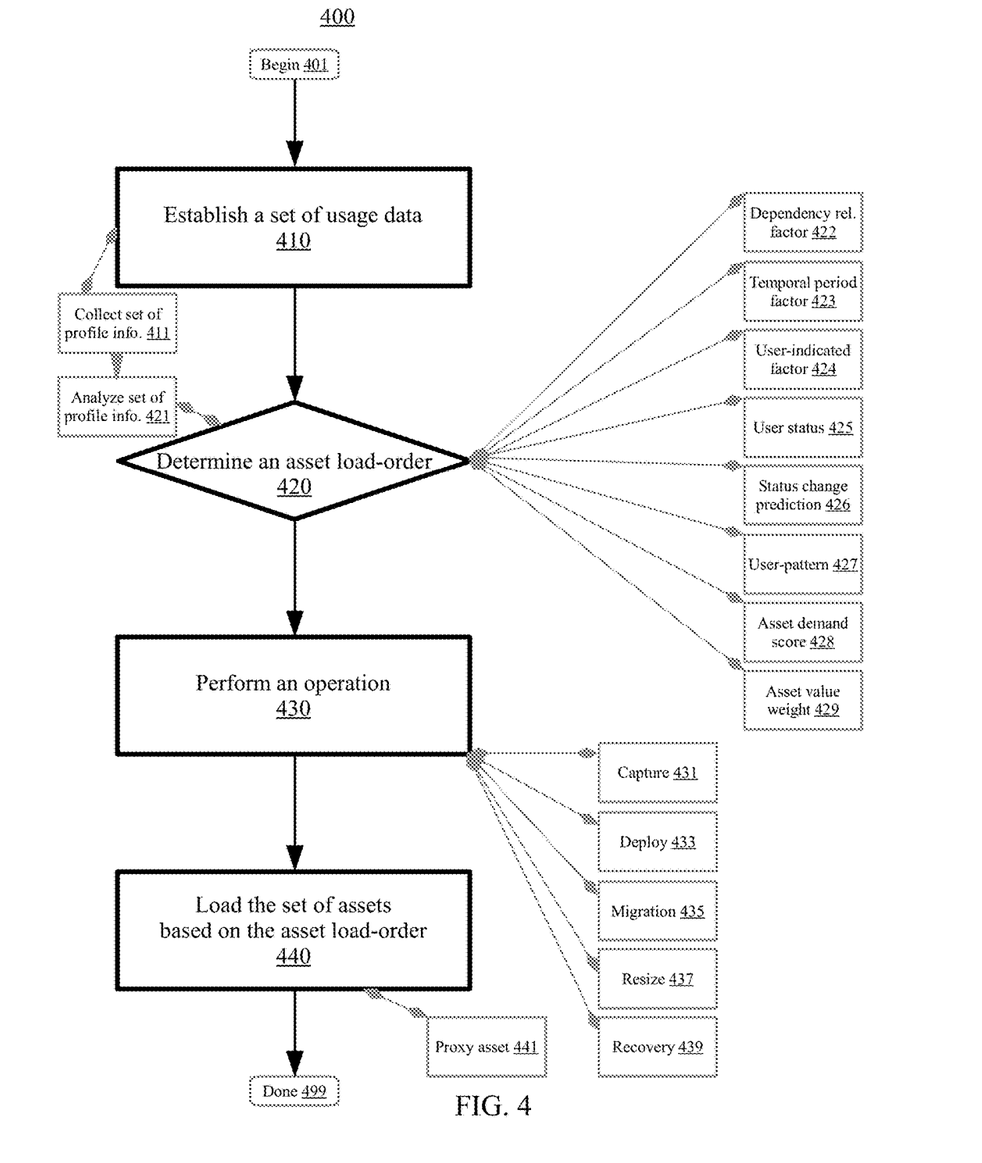
FIG. 4 is a flowchart illustrating a method for managing a set of assets of a shared pool of configurable computing resources according to embodiments.

FIG. 4 is a flowchart illustrating a method 400 for managing a set of assets of a shared pool of configurable computing resources according to embodiments. The shared pool of configurable computing resources may utilize a controller such as a cloud manager to execute/carry-out processes/tasks. Method 400 may begin at block 401.

At block 410, a set of usage data is established by the shared pool of configurable computing resources. The set of usage data corresponds to usage of the set of assets by a set of users. Establishing can include creating, generating, gathering, structuring, or organizing. The set of users includes one or more users (e.g., of a shared pool of configurable computing resources). Usage may include bandwidth, processing, or memory utilization. In embodiments, a set of profile information is collected at block 411. The set of profile information can include an application log, a user history, usage of a virtual machine, an application dependency relationship, or a system dependency relationship.

Example usage data/statistics can relate to online/editing time, a count of applications/tasks/jobs opened/performed, identification of content, frequency, capacity, latency, or user/application interactions. The set of usage data may indicate use of the asset by the user for a temporal period. For example, the set of usage data may indicate the user has used the asset (e.g., application) one time in the past six months (e.g., four months ago). Such usage can be below a threshold value of using the asset at least three times in the preceding six months. In embodiments, the threshold value may be temporal in nature (e.g., February, two years, 36-hour interval). In certain embodiments, the threshold may include a consumption score (e.g., 85 gigabytes per user, 12 terabytes over two days).

For instance, activity by the user may be monitored/tracked/obtained across one or more cloud environments. As such, if the user is actively using a specific resource on a first virtual machine of a cluster but not on other virtual machines of the cluster, then aspects of the disclosure could use such asset activity data to make informed decisions (e.g., relative to looking at each virtual machine individually when installing an application). For example, a single developer/administrator could be monitored/tracked across a group of instances involved in a group of web applications to determine for new virtual machines 'which applications are needed when.' Accordingly, a group of users may have different types of virtual machines with different software/licenses loaded in different orders (e.g., an accountant as compared with a programmer).

At block 420, the shared pool of configurable computing resources determines an asset load-order based on the set of usage data. Determining may include calculating, computing, comparing, evaluating, classifying, or sorting. In embodiments, the set of profile information is analyzed at block 421 to determine the asset load-order. For instance, analyzing can include extracting (e.g., creating a derivation), examining (e.g., performing an inspection), evaluating (e.g., generating an appraisal), dissecting (e.g., scrutinizing an attribute), resolving (e.g., ascertaining an observation/conclusion/answer), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data set which can be provided/furnished) for further use (e.g., to prioritize loading of the set of assets).

For example, the set of usage data may indicate that streaming video services are utilized more frequently in the evening than the use of investment trading services during the same temporal period. However, during midday the investment trading services may have more users (e.g., even if not as much bandwidth). Accordingly, video processing assets may be in greater demand in the evening and can be loaded with a high priority at that time. During midday, even though video processing assets may utilize more bandwidth, user-input factors such as task value may prioritize the investment trading services to be loaded at a higher priority (e.g., faster).

In embodiments, the asset load-order can have a dependency relationship factor (e.g., dependent on an application or user) at block 422. For example, a first application upon which a second application depends may be loaded before a third application which is likely to not be requested by a user until after the second application is requested. In embodiments, the asset load-order can have a temporal period factor at block 423. For instance, if a certain asset is utilized only at a given interval (e.g., every three months such as four times per year on the last day of the quarter), then the certain asset may be given a low priority at other temporal periods (e.g., and potentially a higher priority on the last day of the quarter based on other factors).

In certain embodiments, the asset load-order can have a user-indicated factor at block 424. For example, a cloud administrator can provide an input with respect to setting a first threshold number of virtual machines to generate for a chief information officer which is greater than a second threshold number of virtual machines to generate for an internal change management human resources professional. As such, the input can indicate that at least half of a first requested number of virtual machines for the chief information officer are to be loaded before loading more than one virtual machine for the internal change management human resources professional. The factors and examples listed are for illustrative purposes, other possibilities are considered/contemplated.

In embodiments, a status of the set of users is identified and used to determine the asset load-order at block 425. As such, the asset-load order can be determined by using both the status of the set of users and the set of usage data. The status of the set of users can include an online status and an offline status for a given user or a group (e.g., there are some/no online users on the cloud ecosystem). Other statuses such as hibernating, idle, active, inactive, starting-up, shutting-down, and the like are also possible. The status of the set of users can be related to certain assets such as specific applications or particular virtual machines (e.g., processing a data set using application 'alpha' on virtual machines 'crown' and 'robe'). In various embodiments, the status of the set of users may be utilized to predict/forecast a status change with respect to one or more users of the set of users at block 426. For example, aspects may be utilized to look-ahead as to which user(s) may become active within a threshold temporal period (e.g., and as to what assets/libraries may be requested for initiation/utilization and when).

In certain embodiments, a user-pattern may be generated and form a basis to determine the asset load-order at block 427. The user-pattern may be generated using a machine learning technique. The user-pattern can be based on the set of usage data and configured to predict future asset allocation. For example, the user-pattern may be gathered overtime, can indicate actions which may be used, or may include a compilation of user requests/inputs. For instance, the user-pattern may indicate which user (e.g., financial analyst or petroleum engineer) or indicate a dependency resting on an element with high computational power (e.g., a multidimensional modeling system which uses a plurality of application programs across a plurality of servers using a plurality of databases which are stored with significant accessibility regulations). To illustrate, in an environment with significant security benchmarks, a user-pattern may indicate to first load an authentication service which is likely to be imminently requested by the user.

In various embodiments, determining the asset load-order based on the set of usage data relates to demand for the asset or importance of having the asset. An asset demand score for the set of assets may be determined at block 428 (e.g., scaled proportion of asset requests: alpha=9, beta=83, gamma=48). An asset value weight for the set of assets may be determined at block 429 (e.g., scaled worth of having asset loaded: alpha=1.0, beta=0.1, gamma=0.5). Based on both the asset demand score and the asset value weight, the asset load-order may be determined (e.g., by multiplying asset demand score and asset value weight: gamma=24, alpha=9, beta=8.3). A variety of scoring and weighting methodologies are considered (e.g., using statistical distributions/factors), and a variety of ordering computations may be used (e.g., logarithmic factors).

At block 430, an operation associated with the set of assets is performed by the shared pool of configurable computing resources. The operation may be performed on a virtual machine. The operation can include a capture operation at block 431. The capture operation may capture both a first (operational) state of a first asset of the set of assets and a second (operational) state of a second asset of the set of assets (e.g., on, off, active, inactive, reading, writing). The capture operation can execute a first process on the first asset (e.g., read, analyze, write). A second process on the second asset may be suspended (e.g., paused, hibernated) when the second process is dependent on the first process (e.g., suspended until a triggering event related to the first process). In response to the first process achieving an execution threshold (e.g., initiated, 50% complete, completed), the second process may be executed (e.g., initiating a computation, running the computation).

In embodiments, the operation includes a deploy operation at block 433. The deploy operation may include creating a virtual machine, utilizing an immediacy factor (e.g., sorting assets based on an exigency of loading) to determine the asset load-order, and initiating deployment of the virtual machine. For example, a public emergency operating center may not want to have their most sensitive databases open at all times (e.g., security regulations/concerns), but may desire for those databases to be loaded quickly in response to a request which is urgent and immediate.

In embodiments, the operation includes a migration operation at block 435. The migration operation can detect a triggering event (e.g., error event, resource threshold reached, request to reorganize of assets across virtual machines) associated with the set of assets. A particular asset of the set of assets may be copied from a first location to a second location (e.g., set-up for storage/processing on a different virtual/physical machine). Next, the particular asset of the set of assets can be removed (e.g., deleted) from the first location. For example, a project may have a variety of stages, where a first stage is more efficiently run on a first asset and a second stage is more efficiently run on a second asset. Similarly, other assets may appear online which were originally offline that can impact the overall system performance and call for a reorganization via migration.

In certain embodiments, the operation includes a resize operation at block 437 which may change a capacity of a virtual machine (e.g., 64 gigabytes to 32 gigabytes). In various embodiments, the operation includes a recovery operation at block 439. The recovery operation can include first generating a backup version of a particular asset of the set of assets (e.g., on a same machine or a different machine). Next, a triggering event associated with the set of assets may occur (e.g., a slow-down in flow of data, an error event). In response to the triggering event, the backup version of the particular asset may be launched.

At block 440, in response to performing the operation associated with the set of assets, the set of assets is loaded based on the asset load-order by the shared pool of configurable computing resources. In general, more-valuable/primary resources may be loaded first and less-valuable/secondary resources may be loaded later. Having the more-valuable resources initially loaded and available first allows the user to interact with a new or modified virtual machine earlier and augments a conceptualization of a faster turn-around time involving the aforementioned virtual machine operations. The set of usage data (or the set of profile information) can be utilized over a set of virtual machines that work together. As such, aspects can establish the order/priority of processing of the set of virtual machines. For example, if assets are being migrated to another system and one of the virtual machines is providing a service that is rarely utilized, the service can be prioritized lower than one that is more frequently or constantly utilized.

In embodiments, loading the set of assets based on the asset load-order can include using a proxy asset at block 441. Loading the proxy asset may load a specific asset in response to a request for the specific asset. For example, the proxy asset may be a placeholder which completes a portion of the load (e.g., 5%) in accordance with the asset load-order, but waits until an actual request from a user to finish the load (e.g., allowing other assets to load and be available or utilized). In certain embodiments, aspects may wait for completion of a previously-scheduled load of the specific asset. In general, services that are not immediately migrated can be replaced by proxies that wait for the service to be made available. These proxies can influence the priorities by moving up a virtual machine of a rarely used service when the service is requested during the operation.

Method 400 concludes at block 499. Aspects of method 400 may provide performance or efficiency benefits for managing a set of assets of a shared pool of configurable computing resources. For example, aspects of method 400 may include positive impacts on availability of assets or protection of data/services with respect to assets. Altogether, performance or efficiency benefits when managing a set of assets may occur (e.g., speed, flexibility, responsiveness, resource usage).

Figure 5:
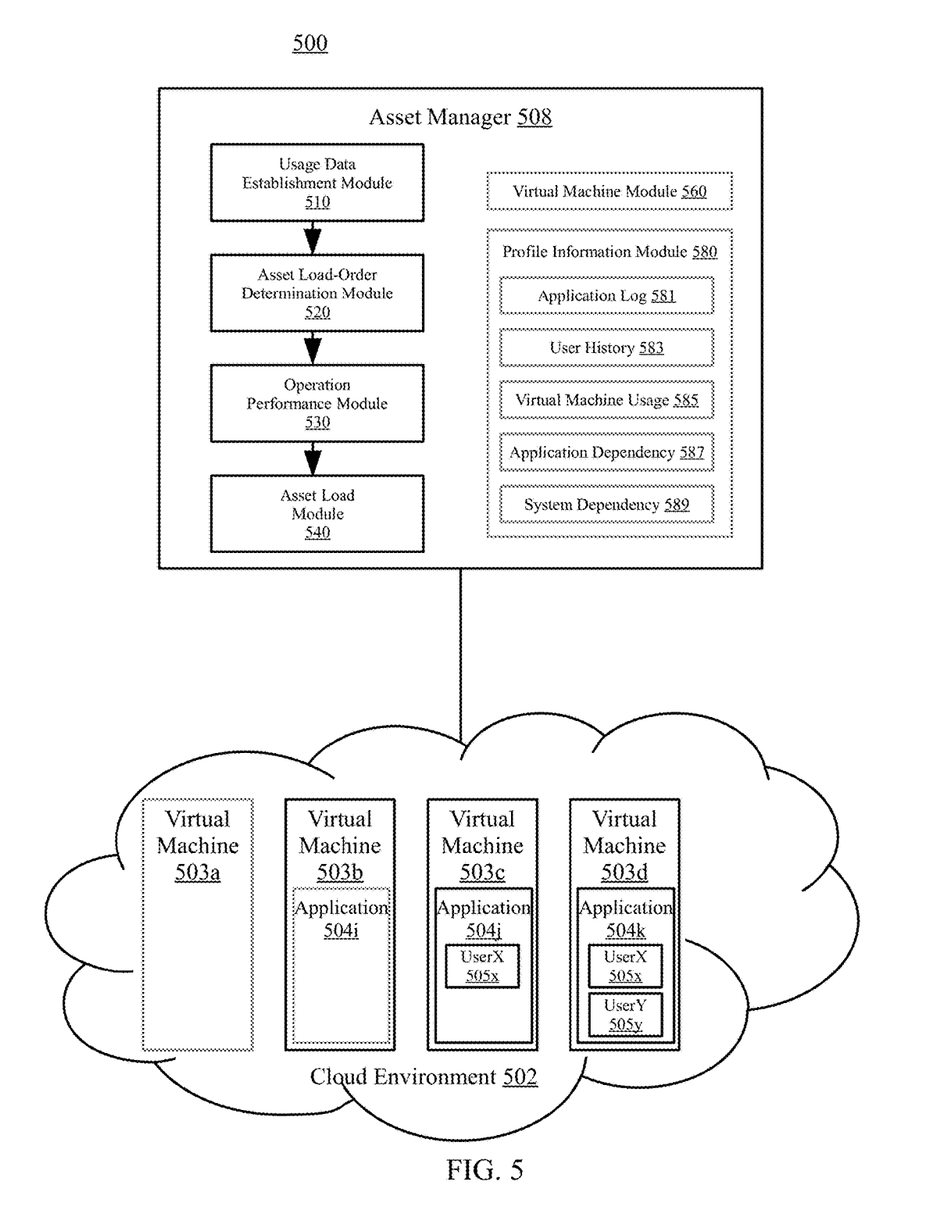
FIG. 5 shows a system for managing a set of assets of a shared pool of configurable computing resources according to embodiments.

FIG. 5 shows a system 500 for managing a set of assets of a shared pool of configurable computing resources according to embodiments. In embodiments, method 400 may be implemented in an asset manager 508. The asset manager may be a module that is at least a portion of a cloud manager. As such, aspects of the discussion related to FIG. 4 and method 400 may be used/applied/implemented in the system 500. Asset manager 508 may be implemented in hardware, software or firmware executable on hardware, or a combination thereof.

The shared pool of configurable computing resources (e.g., cloud environment 502) can include a set of assets such as a set of virtual machines 503 including specific virtual machines 503*a*, 503*b*, 503*c*, 503*d*. The set of virtual machines 503 can include a set of assets such as application 504 illustrated as specific applications 504*i*, 504*j*, 504*k*. Users 505 such as UserX 505*x* and UserY 505*y* may be utilizing one or more specific applications. The cloud environment 502, and aspects thereof, may be associated with a shared pool manager (e.g., cloud manager) having the asset manager 508.

In embodiments, the asset manager 508 may be sufficiently stand-alone and associated directly with the cloud environment 502. The asset manager 508 can prioritize/order the loading of one or more assets (e.g., virtual machines, applications, services). In embodiments, the asset manager 508 can have a (graphical) user interface that allows a user to interact with the asset manager 508 to provide user input, etc. Of course, asset manager 508 could include many other features or functions known in the art that are not shown in FIG. 5.

Asset manager 508 can include a usage data establishment module 510 (see discussion with respect to block 410 of FIG. 4), an asset load-order determination module 520 (see discussion with respect to block 420 of FIG. 4), an operation performance module 530 (see discussion with respect to block 430 of FIG. 4), and an asset load module 540 (see discussion with respect to block 440 of FIG. 4). Asset manager 508 may have a virtual machine module 560. For example, the virtual machine module 560 may generate, tear-down, or otherwise manage one or more virtual machines which may be a portion of the set of assets. Accordingly, the set of assets may include a plurality of virtual machines which cooperate to provide a computing capability (e.g., store data using memory, process data using a processor). Asset manager 508 can include a profile information module 580 having an application log 581, a user history 583, a virtual machine usage 585, an application dependency 587, or a system dependency 589.

In embodiments, the application log 581 corresponds to application-oriented data. For example, the application log 581 may include historical information with respect to which programs/services have run for whom, when, on what machines, for what purpose/task, to what degree of success, etc. Also, predictive information may be included which forecasts future events along the same lines (e.g., who, what, when, why). To illustrate, a compute node history may be stored such that patterns may be recognized for performance or efficiency benefits with respect to what compute node may host a certain virtual machine to run a particular program so as to anticipate a future request. Accordingly, a job processing history may indicate tasks which have been processed by a particular application or service with meta data related to such processing. Altogether, various factors related to resource usage may be recorded in the application log 581.

In embodiments, the user history 583 corresponds to user-oriented data. For example, the user history 583 may include user information with respect to which users have run what programs, when, on what machines, for what purpose/task, to what degree of success, etc. Also, predictive information may be included which forecasts future events along the same lines (e.g., what, when, why, where). To illustrate, a compute node history may be stored such that patterns may be recognized for performance or efficiency benefits with respect to what compute node may be used by a specific user to host a certain virtual machine to run a particular program so as to anticipate a future request. Accordingly, a job processing history may indicate tasks which have been processed using a certain application by a particular user with meta data related to such user and processing. Altogether, various factors related to resource usage may be recorded in the user history 583.

In embodiments, the virtual machine usage 585 corresponds to data related to virtual machine usage. The virtual machine usage 585 may include historical data. The historical data may indicate random or predetermined usage of particular virtual machines. Also, predictive information may be used to forecast future virtual machine usage with respect to quantity, placement, capacity, etc. Which computes node host what virtual machines may be tracked and utilized to assist with efficiencies related to the overall system. What jobs are run and processed by certain virtual machines can be analyzed and used to assist with performance related to the jobs, the virtual machines, etc. Altogether, various factors related to virtual machine usage may be noted in the virtual machine usage 585.

In embodiments, the application dependency 587 corresponds to an application dependency relationship. In embodiments, the system dependency 589 corresponds to a system dependency relationship. For example, one or more user patterns may be utilized. The user patterns may indicate that a first asset is dependent on a second asset (e.g., a minimal essential component may exist). For example, the first asset cannot operate without the second asset operating. Such dependencies may be with respect to an application, a virtual machine, a compute node, an overall computing infrastructure, a particular user, or the like. Various possibilities are considered and may be tracked for historical or predictive purposes, or generally for system resource benefits.

Aspects of system 500 may provide performance or efficiency benefits when managing a set of assets. For example, aspects of system 500 may save resources such as bandwidth, processing, or memory (e.g., faster asset loading). Altogether, a shared pool of configurable computing resources may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a set of assets of a shared pool of configurable computing resources, the method comprising:

establishing, by the shared pool of configurable computing resources, a set of usage data which corresponds to usage of the set of assets by a set of users;

identifying a status of the set of users determining, by the shared pool of configurable computing resources, an asset load-order using the status of the set of users and the set of usage data;

performing, by the shared pool of configurable computing resources, an operation associated with the set of assets, wherein the operation includes a deploy operation including:

utilizing an immediacy factor to determine the asset load-order, and initiating deployment of a virtual machine that including in the set of assets; and loading, by the shared pool of configurable computing resources in response to performing the operation associated with the set of assets, the set of assets based on the asset load-order.

2. The method of claim 1, wherein the set of assets includes the virtual machine.

3. The method of claim 1, wherein the set of assets includes a plurality of virtual machines which cooperate to provide a computing capability.

4. The method of claim 1, wherein the operation includes a capture operation, the capture operation including:

capturing both a first state of a first asset of the set of assets and a second state of a second asset of the set of assets;

executing a first process on the first asset;

suspending a second process on the second asset, wherein the second process is dependent on the first process; and executing, in response to the first process achieving an execution threshold, the second process.

5. The method of claim 1, wherein the operation includes: creating the virtual machine.

6. The method of claim 1, wherein the operation includes a migration operation, the migration operation including:

detecting a triggering event associated with the set of assets;

copying, from a first location to a second location, a particular asset of the set of assets; and removing, from the first location, the particular asset of the set of assets.

7. The method of claim 1, wherein the operation includes a resize operation which changes a capacity of the virtual machine.

8. The method of claim 1, wherein the operation includes a recovery operation, the recovery operation including:

generating a backup version of a particular asset of the set of assets; and launching, in response to a triggering event associated with the set of assets, the backup version of the particular asset.

9. The method of claim 1, further comprising:

collecting a set of profile information, wherein the set of profile information is selected from a group consisting of at least one of: an application log, a user history, usage of a virtual machine, an application dependency relationship, or a system dependency relationship; and analyzing, to determine the asset load-order, the set of profile information.

10. The method of claim 1, wherein determining, using the status of the set of users, the asset load-order includes predicting a status change with respect to one or more users of the set of users.

11. The method of claim 1, further comprising:
generating, using a machine learning technique, a user-pattern which is based on the set of usage data and configured to predict future asset allocation; and
determining, based on the user-pattern, the asset load-order.

12. The method of claim 1, wherein the asset load-order has a dependency relationship factor, a temporal period factor, and a user-indicated factor.

13. The method of claim 1, wherein loading the set of assets based on the asset load-order includes:
loading a proxy asset which loads a specific asset in response to a request for the specific asset.

14. The method of claim 1, wherein determining the asset load-order based on the set of usage data includes:
determining an asset demand score for the set of assets;
determining an asset value weight for the set of assets; and
determining, based on both the asset demand score and the asset value weight, the asset load-order.

15. The method of claim 1, further comprising:
metering use of the asset load-order; and
generating an invoice based on the metered use.

16. The method of claim 1, wherein loading the set of assets based on the asset load-order includes:
waiting for completion of a previously-scheduled load of a specific asset.

17. The method of claim 1, wherein the immediacy factor relates to sorting assets based on an exigency of loading.

18. The method of claim 1, wherein the immediacy factor relates to a request which is urgent.

* * * * *